No. 842,350. PATENTED JAN. 29, 1907.
R. R. SMITH.
DOOR CHECK.
APPLICATION FILED APR. 1, 1905. RENEWED DEC. 12, 1906.
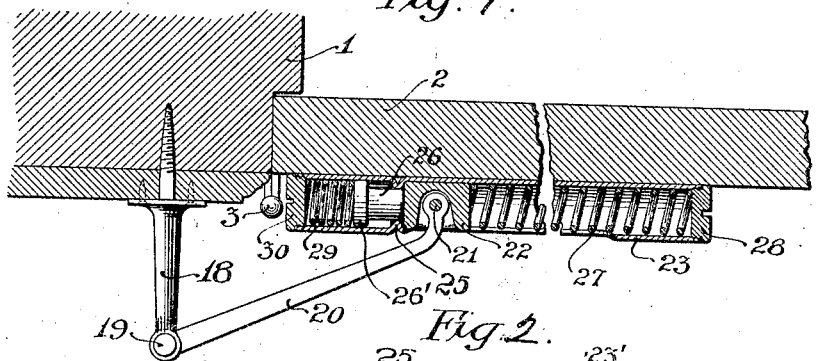
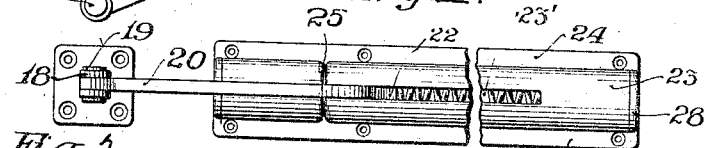
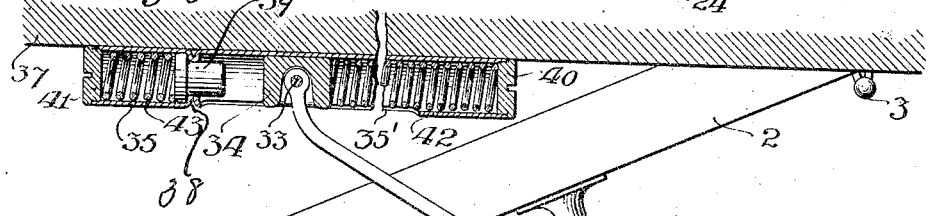
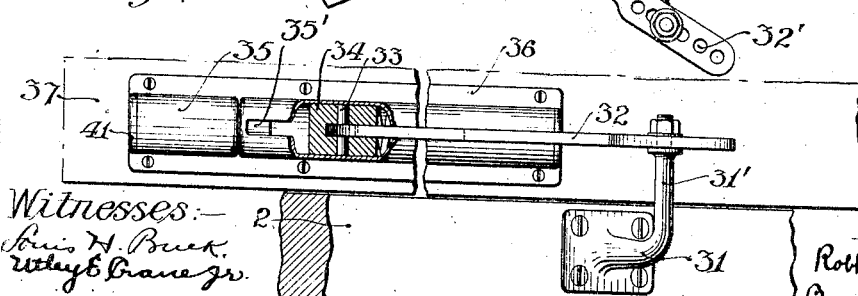
Witnesses:
Inventor:
Robt. R. Smith
By Chas. N. Butler
Attorney.

UNITED STATES PATENT OFFICE.

ROBERT R. SMITH, OF PHILADELPHIA, PENNSYLVANIA.

DOOR-CHECK.

No. 842,350.  Specification of Letters Patent.  Patented Jan. 29, 1907.

Application filed April 1, 1905. Renewed December 12, 1906. Serial No. 347,551.

*To all whom it may concern:*

Be it known that I, ROBERT R. SMITH, a citizen of the United States, residing at Philadelphia, in the county of Philadelphia, State of Pennsylvania, have invented certain Improvements in Door-Checks, of which the following is a specification.

This invention is designed to provide a cushioned checking and closing apparatus for doors and the like, and its leading purpose is to secure simple and inexpensive apparatus therefor which can be applied readily and which will operate efficiently.

Figure 1 represents a longitudinal sectional view of a form of the invention in its relation to a closed door to which it is applied. Fig. 2 represents a plan view of the structure shown in Fig. 1. Fig. 3 represents a longitudinal sectional view of a modified form of the invention; and Fig. 4 represents a plan view, partially in section, of the construction shown in Fig. 3.

In the forms shown in Figs. 1 and 2 the jamb-casing 1, having the door 2 connected thereto by the hinges 3, is provided with a strut 18, having the pivotal connection 19 with a link 20. The link has a pivotal connection with a piston 22 in the cylinder or casing 23 and works in a slot 23′ of the cylinder, the latter having flanges 24 thereon for securing it to the door. A bearing-ring 25, crimped in the cylinder, limits the movement of the piston 22 and the plunger 26. The piston bears against a coiled spring 27, held in the cylinder by the cap or bearing 28, fixed to the end thereof, and the plunger bears against a coiled spring 29, held in the cylinder by the cap or bearing 30, fixed in the opposite end thereof.

When the door is opened, the piston is moved in the cylinder to compress the spring 27, and the spring 29, normally compressed by the greater strength of the spring 27, causes the plunger to follow the piston until the flange 26′ on the plunger engages the bearing-ring 25. When the door is released, the expansion of the spring 27, acting through the cap or bearing 28, closes it, but the closing action is checked by the impact of the piston against the plunger and the consequent thrust of the spring 29 against the cap or bearing 30.

In the form of the invention shown in Figs. 3 and 4 the door 2, supported by the hinges 3, has fixed thereto the bent arm 31, having the vertical member 31′. A link 32, having holes 32′ therein for pivotally and adjustably connecting it to the part 31′, has a pivotal connection 33 with a piston 34, working in a cylinder or casing 35, the latter having a slot 35′ therein, within which the link works. Flanges 36 on the cylinder provide means by which it is connected to the transom-bar 37. In the cylinder is crimped the bearing-ring 38, which acts as a stop for the piston 34 and a stop and bearing for the plunger 39. In the ends of the cylinder are fixed the caps or bearings 40 and 41 for supporting the springs 42 and 43.

It will be understood that the closing and checking mechanism acts through the link and arm in a manner similar to that described in Figs. 1 and 2.

Having described my invention, I claim—

1. In apparatus of the class described, a movable part, a stationary p.  a casing fixed to one of said parts, a link pivotally connected to the other of said parts, coiled springs in said casing, a plunger in said casing actuated by one of said springs, a piston in said casing actuated by the other of said springs and pivotally connected to said link, said plunger being adapted for checking the movement of said piston, and means for limiting the movements of said plunger and piston toward each other, substantially as specified.

2. In apparatus of the class described, a movable part, a stationary part, a strut fixed to one of said parts, a guiding device fixed to the other of said parts, coiled springs therein, a plunger mounted to reciprocate in said device and actuated by one of said springs, a piston mounted to be reciprocated in said device and actuated in one direction by the other of said springs, said springs pressing said plunger and piston toward each other, and a link pivotally connected to said piston and said strut, substantially as specified.

3. In apparatus of the class described, a guiding device, coiled springs supported in said device, a piston in said device and actuated by one of said springs, a plunger mounted to be reciprocated in said device actuated by the other of said springs, said device having a stop for limiting the movement of said piston and plunger toward each other, a link pivotally connected to said plunger, and a strut pivotally connected to said link, substantially as specified.

4. In apparatus of the class described, a cylinder having a bearing crimped therein and removable bearings at the ends thereof, a piston and plunger in said cylinder on opposite sides of said bearing, coiled springs in said cylinder which thrust said piston and plunger toward each other, a link pivotally connected to said piston and reciprocating in a slot in said cylinder, and a strut pivotally connected to said link, substantially as specified.

In testimony whereof I have hereunto set my hand, this 29th day of March, 1905, in the presence of the subscribing witnesses.

ROBT. R. SMITH.

Witnesses:
UTLEY E. CRANE, Jr.,
ROBERT JAMES EARLEY.